(12) United States Patent
Kulkarni et al.

(10) Patent No.: US 8,745,063 B2
(45) Date of Patent: Jun. 3, 2014

(54) HASHING WITH HARDWARE-BASED REORDER USING DUPLICATE VALUES

(75) Inventors: Abhay Kulkarni, Bangalore (IN); Anupam Anand, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1144 days.

(21) Appl. No.: 12/706,515

(22) Filed: Feb. 16, 2010

(65) Prior Publication Data
US 2011/0202744 A1 Aug. 18, 2011

(51) Int. Cl.
*G06F 7/00* (2006.01)
*G06F 17/30* (2006.01)
*G06F 9/26* (2006.01)
*G06F 9/34* (2006.01)
*H04L 12/28* (2006.01)
*H04L 12/56* (2011.01)
*G06F 12/10* (2006.01)
*H04L 12/54* (2013.01)

(52) U.S. Cl.
CPC ...... *G06F 17/3033* (2013.01); *G06F 17/30949* (2013.01); *G06F 12/1018* (2013.01); *H04L 12/5689* (2013.01)
USPC ........................ 707/747; 711/216; 370/395.32

(58) Field of Classification Search
CPC .......... G06F 12/1008; G06F 17/30949; G06F 17/3033; H04L 12/5689
See application file for complete search history.

(56) References Cited

U.S. PATENT DOCUMENTS

| | | | |
|---|---|---|---|
| 6,915,296 B2 * | 7/2005 | Parson | 1/1 |
| 2006/0155952 A1 * | 7/2006 | Haas et al. | 711/216 |
| 2007/0234005 A1 * | 10/2007 | Erlingsson et al. | 711/216 |
| 2008/0229056 A1 * | 9/2008 | Agarwal et al. | 711/216 |
| 2009/0235115 A1 * | 9/2009 | Butlin et al. | 714/8 |
| 2009/0313208 A1 * | 12/2009 | Helfman | 707/2 |
| 2010/0011028 A1 * | 1/2010 | Dade | 707/200 |

OTHER PUBLICATIONS

Freize, Alan et al., "An Analysis of Random-Walk Cuckoo Hashing", Approximation, Randomization, and Combinatorial Optimization. Algorithms and Techniques, Lecture Notes in Computer Science, vol. 5687, Aug. 21-23, 2009,16 pages.
Pagh, Rasmus et al., "Cuckoo Hashing", Elsevier Science, Dec. 8, 2003, 27 pages.
Naor, Moni et al., "History-independent Cuckoo Hashing", Proceedings of the 35th international colloquium on Automata, Languages and Programming. Part II, Section: Track C: Security and Cryptography Foundations: Various Types of Hashing, Lecture Notes in Computer Science; vol. 5126, 2008, 20 pages.
Kutzelnigg, Reinhard, "An Improved Version of Cuckoo Hashing: Average Case Analysis of Construction Cost and Search Operations", Mathematics in Computer Science, 2009, 14 pages.

* cited by examiner

*Primary Examiner* — Yaima Rigol
(74) *Attorney, Agent, or Firm* — McDermott Will & Emery LLP

(57) ABSTRACT

A hash table controller may include a hash calculator configured to receive a key and to determine, based thereon, a first entry in a first bank of a hash table for a value associated with the key and determine a second entry in a second bank of the hash table for the value. The hash table controller also may include a table operations manager configured to determine that the first entry and the second entry are empty, and to store the value and a duplicate of the value at both the first entry and the second entry, respectively.

20 Claims, 9 Drawing Sheets

HASHING WITH HARDWARE-BASED REORDER USING DUPLICATE VALUES

TECHNICAL FIELD

This description relates to use of hash functions to manage data.

BACKGROUND

Hash tables are widely used, for example, to increase speed and accuracy during storage, access, or other manipulation of data. For example, such hash tables and related techniques may be used to quickly identify and access desired data within a very large database. In other examples, hash tables and related techniques may be used during the routing of packets within a communications network, in order to identify a destination of each packet within the network.

In conventional hash tables, a hash function is used to convert a potentially-variable length piece of data into a piece of data having a fixed size at a specified location within the resulting hash table. The variable length or other input data may be referred to as the key, and the hash function may convert the key into a hash index value within the hash table, at which a desired data value may be stored, accessed, or otherwise manipulated.

In a specific example, the hash table may be used to associate individual names with corresponding telephone numbers. In such an example, the individual names may represent the key in the above description, which may be converted by the hash function into a hash index value at which the telephone number (i.e., the data value) may be stored. The resulting hash table may store thousands, millions, or more data records associating names and telephone numbers. Nonetheless, the hash function in question may be chosen such that the index value corresponding to each input key is unique or nearly unique within the hash table. Consequently, at a later time when a user wishes to access the desired stored data (e.g., a desired telephone number), it is only necessary to re-execute the hash function with respect to the specified individual name, whereupon the unique or nearly unique corresponding hash index value may be located within the hash table, so that the corresponding telephone number may also be identified in association therewith.

In practice, existing hash functions may be unable to provide a unique relationship between each key and each stored data value. Instead, it may occur that the hash function sometimes maps two different keys to the same hash index value, and thus results in multiple stored values being associated with the same resulting hash index value.

In such cases, it is possible to associate multiple entries with each hash index value within the hash table. In the example above, for example, a given hash index value may be associated with two entries, so that even if the hash function relates two keys (individual names) with the particular hash index value, then the associated two entries of the hash index value may each be used to store a corresponding data value (e.g., telephone number). At a later time, when a user wishes to access the data value (telephone number) of one of the keys in question, the hash function may be used to relate the key (name) in question to the hash index value having two entries. In this case, it will be necessary to distinguish between the two entries in order to return the desired data to the user. Nonetheless, the hash table in this example provides a significant advantage over many other data access techniques, by quickly providing the two entries of the hash index value to the user. In this way, only these two entries need be considered to identify the desired data value, rather than, e.g., the entire data set.

In the terminology of the art, a hash index value having multiple entries as described above may be referred to as a "bucket," because the hash index value may be considered to be a bucket of entries that may potentially be used to store data values associated with the corresponding hash index value. Although an example was described above in which the referenced bucket included only two entries associated with the hash index value in question, it may occur that a larger number of entries may be provided in association with a given bucket of a hash table. Nonetheless, however many entries are associated with each bucket, it may generally occur over time that as the hash table is filled with more and more data, eventually the hash function may associate more keys with a specific hash index value (bucket) than there are entries contained within the hash index value (bucket). In such a case, it may be impossible to store a subsequent data value within the bucket. Such a circumstance is referred to, for example, as a miss, or a collision. Consequently, a metric known as the "first miss utilization (FMU)" has been developed to describe an efficiency or other utility of a given hash table and associated hashing techniques. That is, the FMU refers to the first such miss that occurs during population or other access of the hash table in question. For example, the FMU may refer to a percentage of the hash table that may reliably be filled with data before a first such miss occurs.

SUMMARY

The details of one or more implementations are set forth in the accompanying drawings and the description below. Other features will be apparent from the description and drawings, and from the claims.

DETAILED DESCRIPTION

Figure 1:
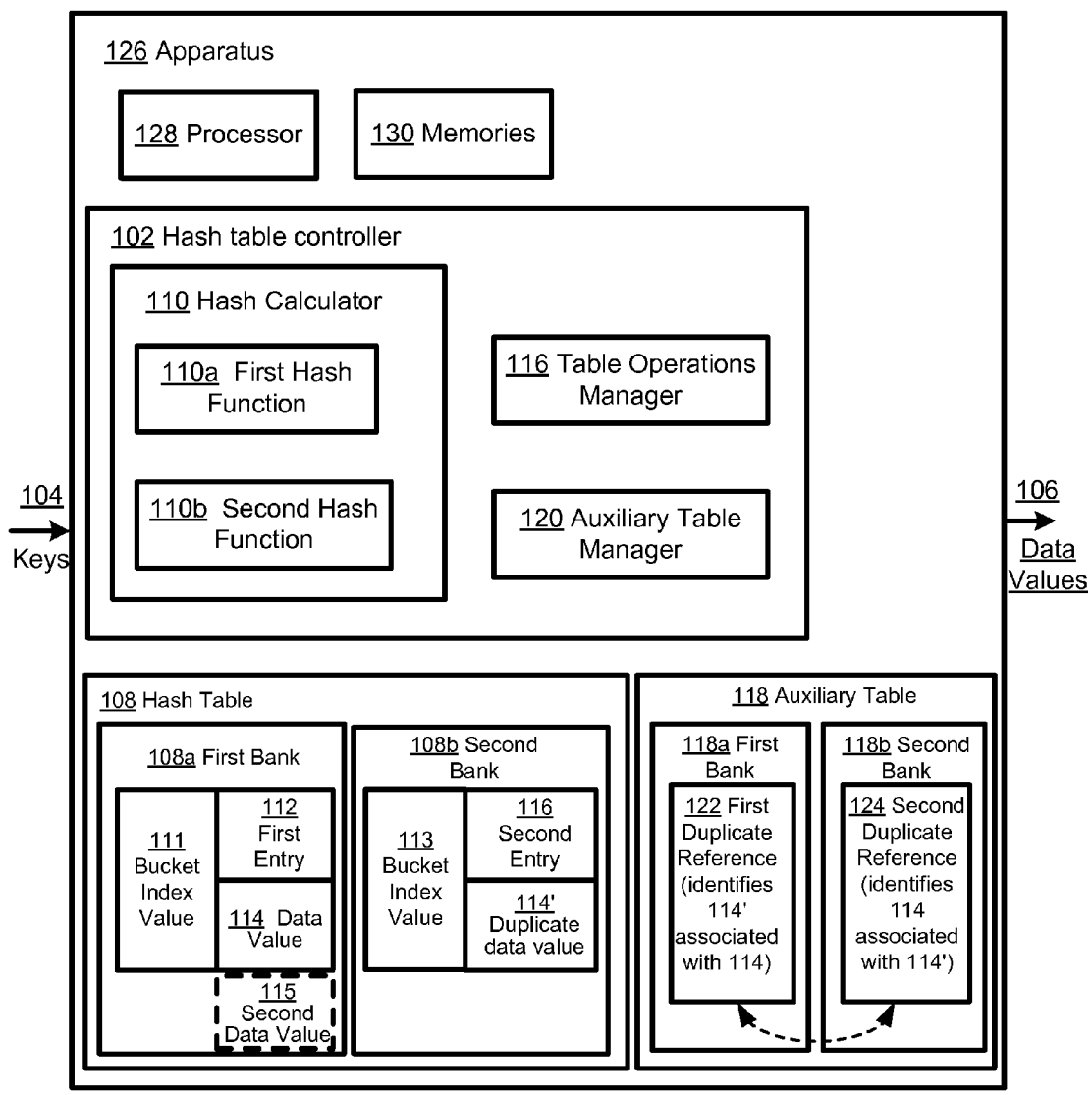
FIG. 1 is a block diagram of system which uses duplicate values to increase hash table efficiency.

FIG. 1 is a block diagram of a system 100 which uses duplicate values to increase hash table efficiency. By using such duplicate values, the system 100 of FIG. 1 increases the probability that storage space will be available for data values to be stored in the future, without requiring movement or reordering of already-stored data values. Consequently, a first miss utilization (FMU) metric may be improved with a minimal additional use of existing hardware and/or software resources, so that a user experience of the storage, access, or other manipulation of data also may be improved, as described in more detail below.

In the example of FIG. 1, a hash table controller 102 is illustrated which is configured to utilize duplicate data values as referenced above, and described in more detail below. In general, the hash table controller 102 may be operable to receive keys 104 and insert, return, or otherwise manipulate data values 106, using a hash table 108. As would be appreciated by one skilled in the art, innumerable examples of keys 104 and data values 106 exist. For example, as referenced above, the keys 104 may represent individual names, while the data values 106 may represent corresponding telephone numbers or any other information about the individuals in question. In other examples, the keys 104 may represent data packets within a communication network, and the data values 106 may represent destination information or other routing information with respect to the data packets in question. More generally, the data values 106 may represent virtually any data values which may be stored in a database or other table format, so that the keys 104 correspondingly represent any information which is desired to be related to, or accessed in conjunction with, such data values.

A hash calculator 110 may be used to receive the keys 104 and execute one or more hash functions therewith in order to populate or otherwise access the hash table 108. Examples of such hash functions are well known in the art, and such existing hash functions may be used virtually interchangeably within the hash calculator 110, as would be apparent.

In the specific example of FIG. 1, the hash calculator 110 is illustrated as including a first hash function 110A and a second (different) hash function 110B. Consequently, the hash calculator 110 may be configured to implement a dual hashing technique in which each hash function 110A, 110B maps a received key 104 to a different hash index value (bucket) of a portion of the hash table 108. In other words, the first hash function 110A, for example, may be different from the second hash function 110B. Consequently, each hash function 110A, 110B may be operable to input a single key 104 and output a corresponding hash index value, thereby resulting in two different hash index values.

As described above, each such hash index value of hash table 108 may be considered to represent a bucket of entries into which the data value to be associated with the hash key may potentially be stored, and are thus referred to in FIG. 1 as bucket value index (or bucket value or bucket index) 111, 113, as described in detail, below. By so doing, the hash controller 102 may increase a total number of keys which may be associated with a given bucket index value within the hash table 108. Therefore, the hash calculator 110, by implementing such a dual hashing technique in which each hashing function 110a, 11b hashes to a bucket value with multiple entries per bucket, reduces the probability that the key 104 in question will be hashed to an already-full bucket, and will therefore increase the probability that the data value to be stored in conjunction with the key 104 in question may in fact have available space within the hash table 108.

Specific examples of the hash table 108 are illustrated in detail below with respect to FIGS. 3-8. However, the hash table 108 of FIG. 1 conceptually illustrates that each of the two hash functions 110A, 110B may correspond with associated subparts of hash table 108 referred to in FIG. 1 as banks of hash table 108, e.g., a first bank 108A and a second bank 108B. More specifically, it may be observed in FIG. 1 that the first hash function 110A corresponds to the first bank 108A of the hash table 108, and therefore may be used to hash a particular key 104 and ultimately identify a first bucket value index 111 and associated first entry 112 of the first bank 108A. Similarly, the second hash function 110B may be used by the hash calculator 110 to hash the same key 104 to a second bucket value index 113 and corresponding second entry 116 of the second bank 108B of hash table 108. Thus, the hash functions 110A, 110B provide parallel hashing of a particular key 104, but because the hash functions 110A, 110B are different from one another and/or associated with the different banks 108A, 108B, the particular key 104 in question may thus be associated equally with the two different entries 112, 116.

Of course, as mentioned, each bucket value index 111, 113 may each typically have multiple associated entries, although each bucket value index 111, 113 is shown with only a single corresponding entry 112, 116 in the simplified example of FIG. 1. In specific examples described herein, the first entry 112 may be one of a pair of entries associated with the corresponding bucket value index 111, while the second entry 116 also may be one of a pair of entries associated with the bucket value 113 of the second bank 108B.

In the example of FIG. 1, a table operations manager 116 is illustrated which is configured to perform various operations using the hash table 108. In specific examples described herein, such table operations may include, for example, insert operations in which data values are inserted into the hash table 108, delete operations in which data values are deleted from the hash table 108, and lookup operations in which the data values are accessed from within the hash table 108. It will be appreciated, however, that such operations are merely non-limiting examples, and that virtually any relevant or desired table operation needed for use of the hash table 108 may be executed for the table operations manager 116.

In the example of FIG. 1, the table operations manager 116 may be configured to execute an insert operation in conjunction with the above-described structure of the hash calculator 110 and the hash table 108. Specifically, as referenced above, the hash calculator 110 may execute the hash functions 110A, 110B against a received key 104, to thereby determine corresponding bucket value index 111 of the first entry 112 and the corresponding bucket index value 113 of the second entry 116. Then, the table operations manager 116 may be configured to store the desired data value for the received key 104 in both the first entry 112 and the second entry 116.

That is, as shown in FIG. 1, the table operations manager 116 may be configured to insert a data value 114 into the first entry 112, and to insert a duplicate data value 114' into the second entry 116. During future operations of the hash table controller 102, a later-received key 104' may be associated with a second data value 115 to be inserted into the hash table 108. More specifically, for example and as described in detail below, it may occur that the second data value 115 may only be available for storage in one (but not both) of the entries 112, 116. Then, because the data value 114 and the duplicate data value 114' are both stored within the corresponding first entry 112 and the second entry 116, the table operations manager 116 may be configured to delete either the data value 114 or the duplicate data value 114', and to thereafter insert the newly-received second data value 115 into the thus-created space within the cleared entry.

In this way, the table operations manager 116 may increase a likelihood that the second data value 115 may be inserted into the hash table 108, without requiring movement or reordering of already-stored data values. For example, if the table operations manager 116, in an additional or alternative embodiment, stores the data value 114 in only the first entry 112, while leaving the second entry 116 blank or empty, then it may later occur that the second data value 115 is required to be inserted into the first entry 112. In such a case, it is possible to move or reorder the value 114 from the first entry 112 to the second entry 116.

Such an implementation may be referred to in the art as cuckoo hashing, and is compatible with operations of the table operations manager 116. Such movement of data values within the hash table 108 may be used to increase the FMU of the hash table 108, at a cost of, for example, instigating a chain reaction of movements within the hash table 108 which must generally be overseen and executed by associated software. Although such software operations, as just mentioned, may be instrumental in improving the FMU of the hash table 108, such software operations also may undesirably or impermissibly consume system resources to the point where the software operations become undesirable or impossible. Moreover, as described in more detail below, some implementations of the hash table 108 may exist which may not be compatible with such software operations.

Through the use of duplicate data values 114, 114', the table operations manager 116 preserves the possibility of space being available for the second data value 115, without knowing in advance which of the entries 112, 116 will ultimately be needed or required for the storage of the second data value 115. In this way, the table operations manager 116 may reduce or eliminate the need for the above described movement or reordering of data values within the hash table 108.

As an example embodiment of the implementation of the duplicate data value techniques just described, an auxiliary table 118 may be implemented by a corresponding auxiliary table manager 120 of the hash table controller 102. As described and illustrated below in detail with respect to FIGS. 3-8, the auxiliary table 118 may be used to record, track, or otherwise use duplicate values (e.g., the duplicate values 114, 114'), within the respective banks 108A, 108B, of the hash table 108.

For example, the auxiliary table 118 may be constructed so as to have a structure which corresponds directly or indirectly to the hash table 108. For example, as described below with respect to the examples of FIGS. 3-8, the auxiliary table 118 may be constructed to exactly mirror a structure of the hash table 108, so that, for example, the first bank 108A of hash table 108 has a corresponding first bank 118A of the auxiliary table 118, while the second bank 108B of the hash table 108 has a corresponding second bank 118B of the auxiliary table 118. Further, each hash index value (also referred to as bucket, bucket value, bucket index, or bucket index value, e.g., 111, 113) of hash table 108 and corresponding banks 108A, 108B thereof may have corresponding bucket index values within the auxiliary table 118 and corresponding banks 118A, 118B thereof. Still further, each such bucket may have corresponding numbers of entries within the banks 108A/108B and corresponding banks 118A/118B.

Then, the auxiliary table manager 120 may use the auxiliary table 118 to record/track or otherwise utilize the duplicate values of the hash table 108. For example, as shown, the first entry 112 and the corresponding data value 114 may correspond to a first duplication reference 122 of the first bank 118A of the auxiliary table 118. Meanwhile, the second entry 116 and the corresponding duplicate data value 114' may correspond to a second duplicate reference 124 of the second bank 118B. That is, the first duplicate reference 122 identifies that the data value 114 has a duplicate data value (i.e., 114') stored at the second entry 116. Conversely, the second duplicate reference 124 indicates that the duplicate data value 114' is the duplicate of the data value 114 within the first entry 112.

Of course, inasmuch as the data values 114, 114' are duplicates of one another, either may be referred to as the "duplicate data value," but 114' is generally referred to as the duplicate data value herein merely for the sake of clarity and consistency.

It may be appreciated, then, as described in more detail below, that the table operations manager 116 may conduct an insert operation of the data value 114 by, as referenced above, inserting the data value 114 into the first entry 112 and simultaneously inserting the duplicate data value 114' into the second entry 116. Meanwhile, in parallel, the auxiliary table manager 120 may reflect these operations of the table operations manager 116 by recording the first duplicate reference 122 pointing to the second duplicate reference 124, and, at the same time, recording the second duplicate reference 124 indicating the location of the first duplicate reference 122. In this way, the table operations manager 116 may have knowledge that the data value 114 has an existing duplicate data value 114', as well as knowledge about where the duplicate data value 114' exists and is stored within the second bank 108B (and vice versa for the duplicate data value 114' with respect to the data value 114).

Of course, it may occur that a given data value is stored within a bank 108A/108B of the hash table 108, without having a duplicate data value stored within the complimentary bank. For example, it may occur that, at a time of the storing of such a data value, a corresponding location of the complimentary bank and its associated hash function is already full of previously-inserted data values. In such a case, there may be no available entries for storage of the duplicate data value, so that the table operations manager 116 is only able to insert such a data value within a single bank of the banks 108A/108B. In such a case, the auxiliary table manager 120 would have no need to include any corresponding duplicate references for such a data value, and would thus not modify the auxiliary table 118.

During later operations, when the second data value 115 is desired to be stored within the hash table 108, as referenced above, the table operations manager 116 may determine, in conjunction with the hash calculator 110, that only the first entry 112 provides a possible storage location for the second data value 115. In such a case, the table operations manager 116 may delete data value 114 from the first entry 112, based on the reliance, and the availability of, the duplicate data value 114' within the second entry 116. In conjunction with inserting the second data value 115 into the first entry, then, the auxiliary table manager 120 may delete or otherwise modify both the first duplicate reference 122 and the second duplicate reference 124 since, at that time, neither the first entry 112 nor the second entry 116 contains a duplicate of the complimentary/other entry.

In the example of FIG. 1, the hash table controller 102, the hash table 108, and the auxiliary table 118 are illustrated as being executed using an apparatus 126. As would be appreciated by one of skill in the art, the apparatus 126 may represent virtually any data processing apparatus, or portion thereof, which may be used to implement the hash table controller 102, the hash table 108, and the auxiliary table 118. For example, the apparatus 126 may include a microchip(s) on which a processor 128 and one or more memories 130 are included. For example, the processor 128 may represent a central processing unit (CPU) and the memories 130 may include random access memory (RAM) from which software instructions may be loaded to the processor 128. For example, such software instructions may be utilized to implement the cuckoo hashing and associated reordering of the first bank 108A and the second bank 108B described above as being useful and improving the FMU of the hash table 108.

However, as also referenced above, such software-based reordering typically consumes an undesirably large amount of bandwidth or other resources of the apparatus 126. That is, it may be appreciated that many other components, not specifically shown in FIG. 1, may be included in, or used in conjunction with, the apparatus 126. Such additional components already may impose a significant burden on use of the processor 128, so that resources of the processor 128 and any associated memories of the processor 128 may therefore be effectively unavailable for operation of the hash table controller 102, the hash table 108, or the auxiliary table 118. Further, such software based reordering may require multiple table operations per re-order step, which undesirably consumes table access resources.

Therefore, for these and related reasons, in the example implementations, the hash table controller 102, the hash table 108, and the auxiliary 118 may be implemented as hardware components of the apparatus 126. For example, the hash table 108 and the auxiliary table 118 may be constructing using hardware memories (e.g., registers and associated control elements). That is, such control elements may be considered to be included within the hash table controller 102, e.g., the table operations manager 116 and the auxiliary table manager 120. Further, the hash calculator 110 also may be implemented in hardware, using conventional components for executing the hash functions 110A, 110B.

By implementing the hash table controller 102, the hash table 108, and the auxiliary table 118 in hardware, it may be appreciated that resources of the processor 128 may be conserved for other users within (or in association with) the apparatus 126. Moreover, operations of the hash table controller 102, the hash table 108, and the auxiliary table 118 may be executed in a time frame corresponding to a minimum number of cycle operations of the processor 128. In particular, memories of the memories 130 used to implement the hash table 108 and the auxiliary table 118 may be implemented as dual port or dual port interface memories, in which two operations (e.g., read/write operations) may be executed in a single cycle of the processor 128. In this way, for example, the duplicate data values 114 and 114' may be written to the memories 130 in a single cycle of the processor 128. In another example, when necessary to remove the duplicate references 122, 124 from the auxiliary table 118, again, both operations may be executed using the single cycle of the processor 128.

Thus, in some implementations, it is possible to execute the hash table controller 102 entirely in hardware to execute the functions described herein with respect to the hash table 108 and the auxiliary table 118. Nonetheless, as referenced above, the hash table controller 102 is also compatible with the software-based reordering of the hash table (e.g., cuckoo hashing). For example, in some implementations, the hash table controller 102 may be used as an initial technique for improving the FMU of the hash table 108. At some point, control may be transferred from the hash table controller 102 to a software-based reordering of the hash table 108. For example, after one or more misses or collisions within the hash table 108, the hash table controller 102 may be stopped, and control may be transferred to software instructions executed by the processor 128. In such a case, it may be necessary or desirable to erase the contents of the auxiliary table 118, so that, for example, if and when control is returned to the hash table controller 102, then operations and use of the auxiliary table 118 may proceed from an initial stage in the manner described above.

In other examples, it may occur that the hash table 108 is implemented as a hardware accessible hash table. That is, in certain security-related uses of the hash table 108 (e.g., firewalls), the hash table 108 may be implemented as only being accessible only (or primarily) by other hardware elements. In such a case, the software-based reordering schemes (e.g., cuckoo hashing) may not be practical or available for use in implementing the hash table 108. In such a case, the hash table controller 102 may be particularly useful in improving the FMU of the hash table 108.

Figure 2:
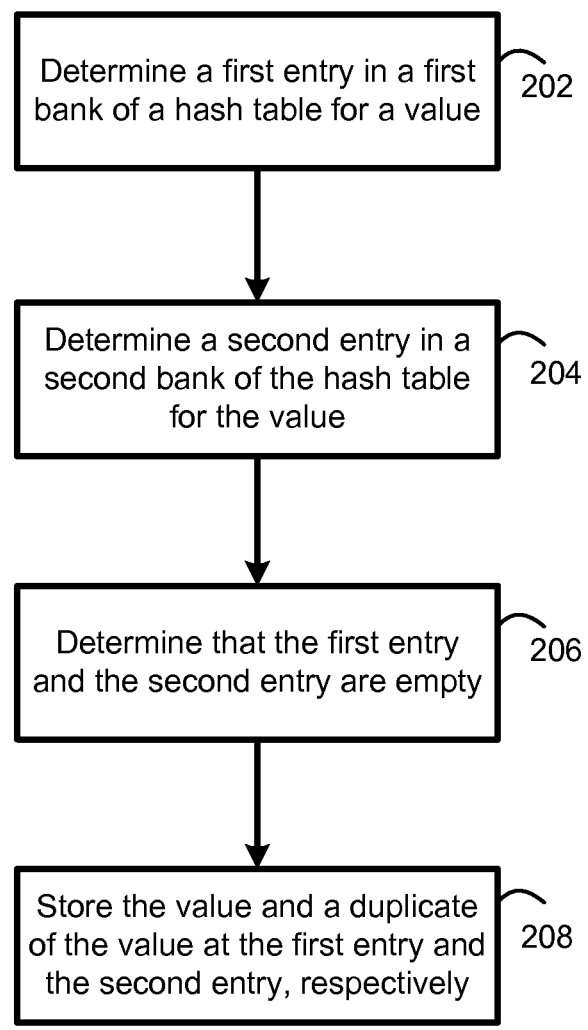
FIG. 2 is a flowchart illustrating example operations of the system 100 of FIG. 1.

FIG. 2 is a flowchart 200 illustrating examples of the system 100 of FIG. 1. In the example of FIG. 2, operations are illustrated in a sequential order, and including discrete operations 202, 204, 206 and 208. However, it will be appreciated that FIG. 2 provides merely one example of the operations of the flowchart 200, and that many additional or alternative examples or operations may be included, as well. For example, the operations 202-208 may occur in partially overlapping or parallel fashion, or may occur in a different order from that illustrated, unless specifically stated otherwise herein.

In the example of FIG. 2, the first entry in a first bank of hash tables may be determined for a value (202). For example, the hash table calculator 110 may receive a first key 104, and may execute the first hash function 110A to thereby ultimately determine the first entry 112 as being associated with the first bucket index value 111. Then, the table operations manager 116 may be configured to store or insert the data value 114 associated with the key and hashed to the first entry 112 of the first bucket index 111 thereinto.

A second entry in a second bank of the hash table may be determined (204). For example, the hash table calculator 110 may use the second hash function 110B to hash the same key 104 to the second entry 116 of the bucket index value 113 of the second bank 108B. That is, as referenced above, the hash calculator 110 may thus hash the same key using the two different hash functions 110A, 110B to thereby obtain two different bucket index values 111, 113 of the two respective banks 108A, 108B. As described above, such operations may occur in essentially parallel or overlapping fashion, and the table operations manager 116 may be configured to insert the value associated with the key 104 into the thus determined entries 112, 116, as referenced above and as described in more detail below.

The first entry and the second entry may be determined to be empty (206). For example, upon determination by the hash calculator 110 of the corresponding bucket index values, 111, 113, as determined from the key 104, the table operations manager 116 may ascertain that the first entry 112 and the second entry 116 do not currently contain any value, and are thus empty. Of course, in additional or alternative operations, it may occur that one or both of the entries 112, 116 are currently full. Operations of the table operations manager 116 in such an eventuality are also referenced above and described in more detail below.

The value and duplicate of the value may then be stored at the first entry and the second entry respectfully (208). For example, as just described, the table operations manager 116 may be configured to store the data value 114 at the first entry 112, while storing the duplicate data value 114' at the second entry 116. As described herein, by inserting both the data value 114 and the duplicate data value 114' into each bank 108A, 108B of hash table 108, the table operations manager 116 thus ensures that in the eventuality that the second data value 115 is later determined for storage in only one of the entries 112, 116, then the table operations manager 116 will be able to accomplish an insertion of the second data entry value 115 by deleting the appropriate one of the value 114 and the duplicate value 114'. Moreover, the table operations manager 116 need not know in advance which of the entries 112, 116 will be required, and may instead preserve the possibility that either entry 112, 116 may be used, as needed, for insertion of the second data value 115 at the appropriate time.

FIGS. 3-8 illustrate more detail in specific examples of the operations of the system 100 of FIG. 1. In the examples of FIGS. 3-8, the hash table 108 and the auxiliary table 118 are illustrated, and are assumed to have the same or similar constructions as described above with respect to FIG. 1. For example, as shown, the hash table 108 includes a first bank 108A and a second bank 108B. Correspondingly, the auxiliary table 118A includes a first bank 118A and a second bank 118B. As shown, each bank 108A, 108B of the hash table 108 includes a bucket index labeled as 304 in FIG. 3, as well as associated entries 302. That is, the entries 302 correspond to the entries 112, 116 of FIG. 1, while the bucket index values 304 correspond to the bucket index values 111, 113 of FIG. 1. As shown, the hash table 108 thus includes the first bank 108A as having 8 bucket index values 0-7, each of which is associated with 2 entries 0, 1. Similarly, the hash table 108 includes the second bank 108B as including the same bucket index values 0-7 and also each associated with 2 entries 2, 3. As shown, the auxiliary table 118 exactly mirrors the depth and structure of the hash table 108.

In an initial state, the hash table 108 and the auxiliary table 118 may be considered to be empty of any stored values. At the arrival of a first key 104, the hash calculator 110 may simultaneously execute the first hash function 110A and second hash function 110B thereon. For example, as in the examples above, the key 104 may represent an individual's name, and the first hash function 110A may hash or map the individual name to the bucket index value 3 of the bucket index values 304 within the first bank 108A, while the second hash function 110B may map the same individual name to the bucket index value 1 of the bucket index values 304 in association with the second bank 108B. In this example, the data value A may correspond to a telephone number of the individual, so that the same telephone number is stored within the bucket index value 3 in the first bank 108A and, also within the bucket index value 1 within the second bank 108B (as shown in the legend of FIG. 3 in which "FB" refers to first bank and "SB" refers to second bank).

Figure 3:
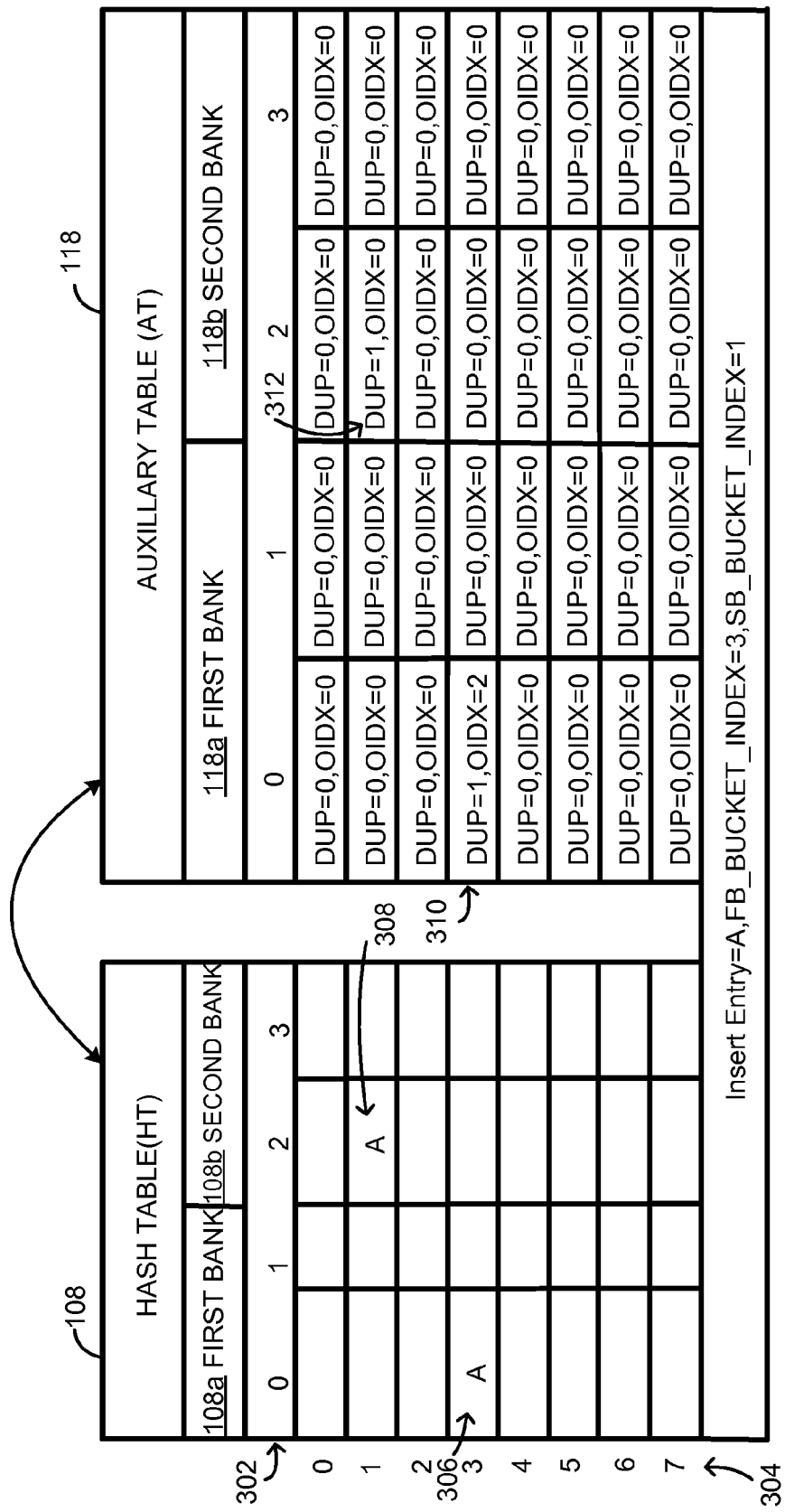
FIG. 3 illustrates a first example of a hash table and associated auxiliary table used in the system of FIG. 1.

As shown, and as described above, each bucket or bucket index value is associated with 2 entries in the example of FIG. 3. Since all entries are empty in an initial state of the hash table 108 (and in the auxiliary table 118), it is not necessary to determine whether the entries 112, 116 are full or empty, and it is an arbitrary decision as to whether to place the data value 306 within the entry 0 or 1 of the entries 302 within the first bank 108A. Similarly, it is effectively an arbitrary decision as to whether to place the data value 308 within the entry 2 or 3 of the entries 302 within the second bank 108B.

Upon insertion of the data values 306, 308, the auxiliary table 118 may be used to track or otherwise record the fact that each of the data values 306, 308 has a corresponding duplicate data value within the hash table 108. Specifically, in the example of FIG. 3, the auxiliary table 118 is illustrated such that each entry and corresponding bucket index value thereof is structured to contain at least 2 pieces of information. Each entry and corresponding bucket index includes a duplicate flag "DUP" which may be set to 1 to indicate that the corresponding data value in fact has a duplicate value within the hash table 108, or to 0 to indicate that the corresponding data value does not have a duplicate value within the hash table 108. Further, each entry and corresponding bucket index of the auxiliary table includes an entry identifier "OIDX" which indicates which of the 2 possible entries in a given bucket the corresponding duplicate value may be stored.

Thus, in the example of FIG. 3, the table operations manager 116 may insert the data value 306 and the duplicate data value 308 as described above, and may thereafter, or in conjunction therewith, inform the auxiliary table manager 120 of this insertion operation. The auxiliary table manager 120 may then set the duplicate value "DUP" of the auxiliary table entry 310 corresponding to the data value 306 to a value of 1 to indicate that the data value 306 has a duplicate value within the hash table 108. The auxiliary table manager 120 may also similarly set the entry 312 of the auxiliary table 118 to have a duplicate flag DUP set to the value 1, indicating that the duplicate data value 308 itself has a duplicate value within the hash table 108.

With the structure described above, the hash table controller 102 is always able to quickly and specifically locate a presence and location of a duplicate data value for any value within the hash table. For example, considering the data value 306, the hash table controller 102 may, when necessary, determine that the value 306 has a duplicate value within the hash table 108 by consulting the entry 310 of the auxiliary table 118. Similarly, the hash table controller 102 may determine that the duplicate data value 308 itself has a duplicate by consulting the entry 312 of the auxiliary table 118.

Upon determining that the duplicate value 306 has a duplicate value within the hash table, the hash table controller 102, e.g., the table operations manager 116, may then determine an exact location of such a duplicate value i.e., the duplicate value 108, within the hash table 108. Specifically, the hash table operations manager 116 may simply instruct the hash table calculator 110 to re-execute the second hash function 110B for the original key 104 of the data value 306 "A", to thereby determine or re-determine the bucket index value 1 of the bucket index values 302. Then, by again consulting the entry 310 of the first bank 118A of the auxiliary table 118, the table operations manager 116 may further determine that the duplicate data value 308 is contained within the entry 2 of the entries 302 (i.e., that the OIDX value is set equal to 2 within the entry 310).

Similarly, given the location of the duplicate data value 308, the table operations manager 116 may determine the presence of a duplicate data value by virtue of the duplicate flag DUP being set to 1 within the entry 312 of the auxiliary table 118, and may determine a location of the duplicate data value 306 by rehashing the original key 104 with the first hash function 110A to thereby determine the bucket index value 3 of the bucket index value 304, and may determine further that the data value "A" is stored at the entry 0 of the entries 302 by consulting the OIDX value within the entry 312 of the auxiliary table 118.

Figure 4:
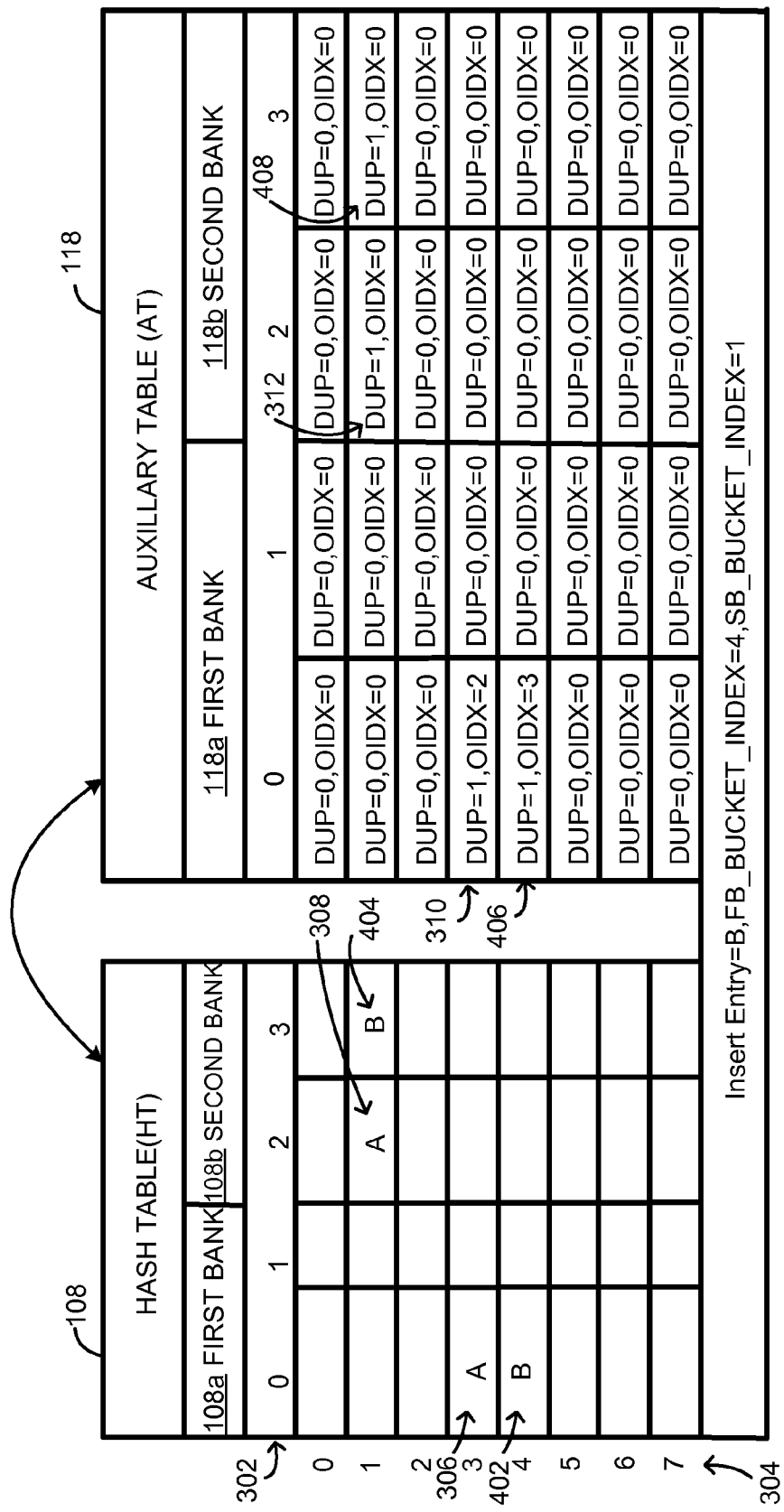
FIG. 4 illustrates a further example implementation of a hash table and associated auxiliary table of FIG. 3.

Thus, FIG. 3 illustrates an example in which the hash table controller 102 is configured to receive a key 104, to hash the key 104 to two different bucket index values, and to store the associated data value of the key 104 in an entry of each of the 2 bucket index values. FIG. 4 illustrates essentially the same functionality, with respect to a second-received key, which is associated with a different data value "B." Thus, the second-received key may be hashed by the first hash function 110A to be stored at an entry 402 of the hash table 108, and, specifically, to be stored within bucket index value 4 of the bucket index value 302, at an entry 0 of the entries 304 thereof. In the example, both entries 0, 1 of the bucket index value 4 are empty, so that the value B may be inserted into either.

Meanwhile, the table operations manager 116 may receive from the second hash function 110B a bucket index value 1 of the bucket index values 304, and may determine that the entry 2 of the entries 302 is already filled (with data value A in entry 308, as shown). The table operations manager 116 may thus insert the data value "B" as a duplicate value within the available entry 3 of the second bank 108B, identified in FIG. 4 as entry 404.

Further, as already described above with respect to FIG. 3, corresponding entries may be made into the auxiliary table 118, so as to identify a presence and location of a duplicate data value for each of the data values "B". Specifically, as shown, the data value at entry 402 has a corresponding entry in the auxiliary table 118 at entry 406, which has the identical bucket index and entry values as the entry 402. As shown, the duplicate flag DUP is set to 1 to indicate that the value "B" at entry 402 has a duplicate value within the second bank of the hash table 108, and the entry index value OIDX is set equal to 3 to indicate that the duplicate value in the entry 404 is, in fact, stored within the entry 3 of the entries 304. Similarly, the entry 404 for the duplicate data value "B" may be associated with entry 408 of the auxiliary table 118, where again the duplicate flag DUP is set to 1 and the entry index value OIDX is set to 0.

As described above with respect to FIG. 3, the table operations manager 116, given one of the values "B" at the entries 402, 404 is thus provided with all information necessary to find the other, duplicated value within the hash table 108. For example, if given the entry 402 containing the data value "B", the table operations manager may consult the hash table calculator 110 to determine from the second hash function 110B that the key of the data value "B" maps with the second hash function 110B to the bucket index value 1 of the bucket index values 304. Then, the table operations manager 116 may consult the entry 406 of the auxiliary table 118 to determine that the data value "B" is stored within an entry 3 of the second bank 108B of the hash table 108. Converse operations apply when the table operations manager 116 is given the duplicate data value "B" at the entry 404, so as to determine the present location of the corresponding data value at entry 402.

As may be observed from the example of FIGS. 3 and 4, in the described examples, it has occurred that each desired entry within the hash table 108 has been empty at a time of a desired insertion of a data value. Of course, as the hash table 108 is increasingly used and filled, it may occur that one or more of the desired entries already has a data value stored therein. For example, in FIG. 5, it may be observed as in FIG. 4 that the bucket index value 1 of the bucket index values 304 has both entries 2 and 3 of the entries 304 within the second bank 108B filled (i.e., with data values "A" and "B" within entries 308 and 404, respectively).

Figure 5:
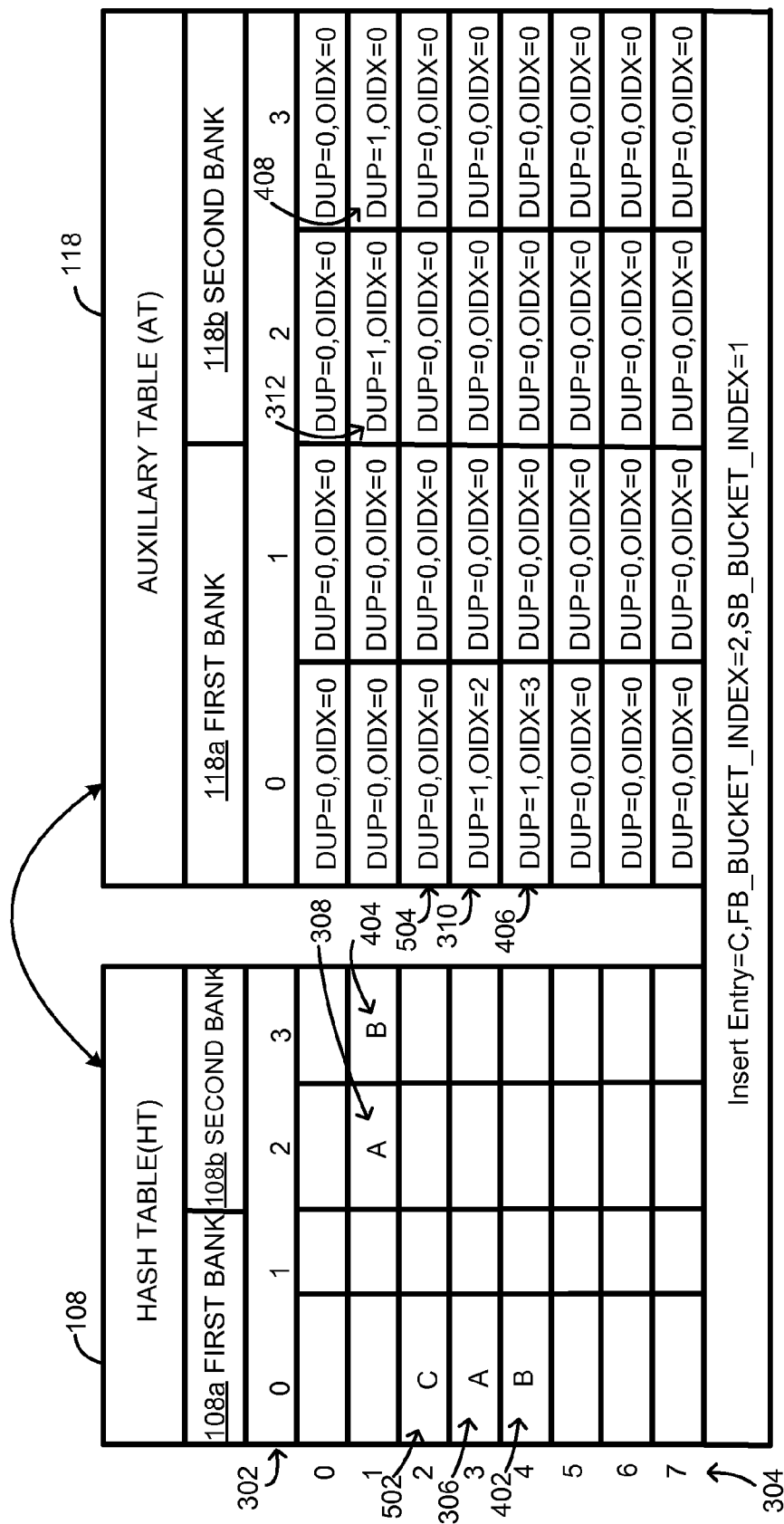
FIG. 5 illustrates a further example implantation of the hash table and associated auxiliary table of FIG. 4.

Thus, in the example of FIG. 5, it may occur that a third-received key is hashed by the hash calculator 110, so that the third-received key is hashed by the first hash function 110A to the entry 502 of FIG. 5, i.e., to bucket index value 2 of the bucket index values 302, and then inserted at entry 0 thereof in the entries 304. Meanwhile, the third-received key may be hashed by the second hash function 110B to the bucket index value 1 of the bucket index values 304. As just referenced, both entries 2 and 3 of the bucket index value 1 are already filled from previous insert operations of the hash table controller 102, as described with respect to FIGS. 3 and 4.

Thus, the data value "C" corresponding to the third-received key may not be stored in accordance with the second hash function 110B at the hashed bucket index value of 1 of the bucket index values 304. Nonetheless, due to the presence and operation of the first hash function 110A, the data value C may be stored at entry 502 of the first bank 108A of hash table 108. Because no duplicate data value of the data value "C" is thus stored within the hash table 108, the auxiliary table 118 need not be modified. Specifically, as shown at an entry 504 of the auxiliary table 118, the duplicate flag DUP may be left as equal to 0, while the entry index value OIDX is also left equal to 0.

Figure 6:
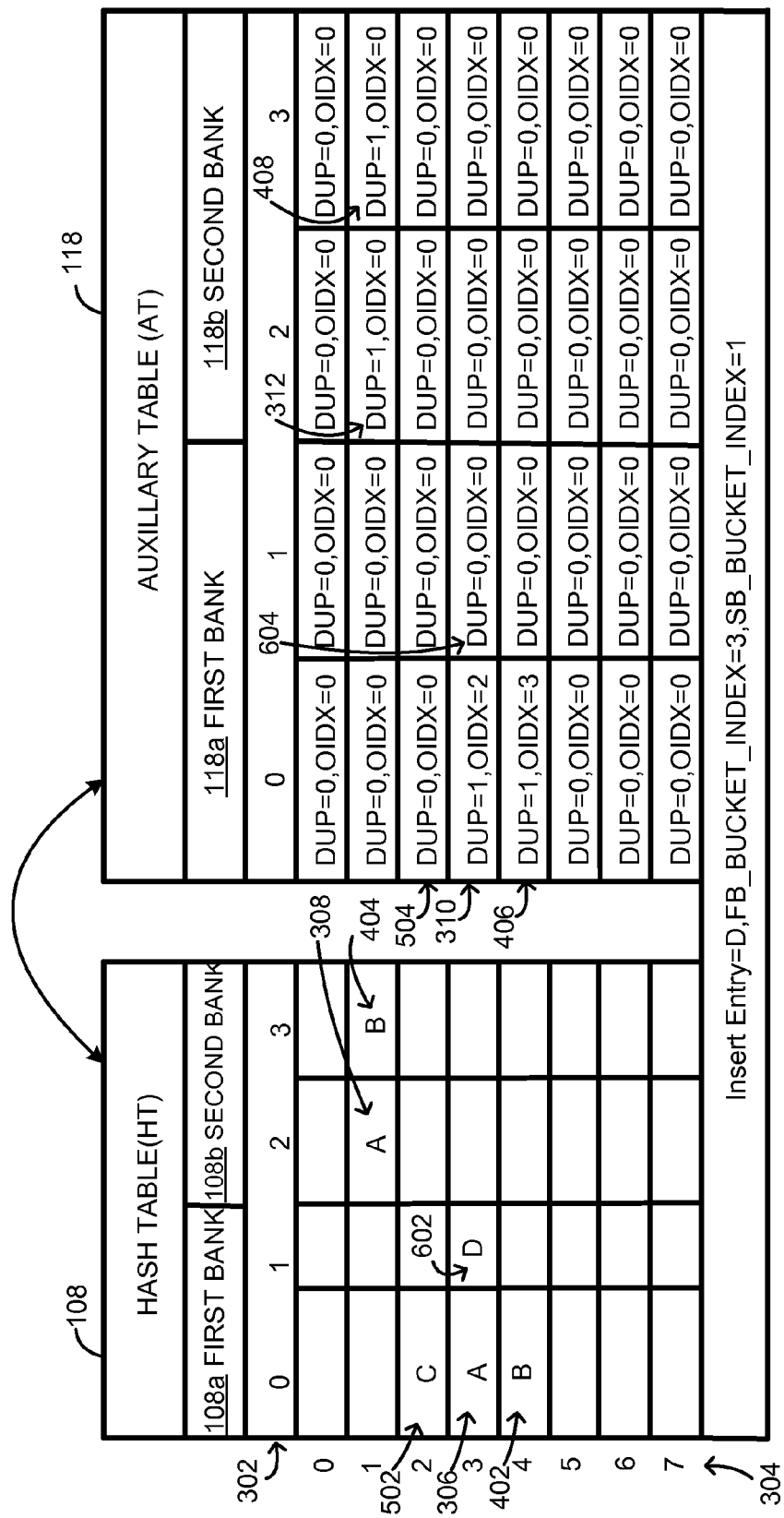
FIG. 6 illustrates a further example implantation of the hash table and associated auxiliary table of FIG. 5.

FIG. 6 is similar in operation and results to the example of FIG. 5. Specifically, in the example of FIG. 6, a fourth-received key may be hashed by both the first hash function 110A and the second hash function 110B. As a result, the data value "D" to be stored may be associated with both of the bucket index value 3 within the first bank 108A, and with the bucket index value 1 within the second bank 108B. As already described and illustrated, however, the bucket index value 1 for the second bank 108B is already full (i.e., with data values "A" and "B" stored within entries 2 and 3 respectively).

Consequently, as with the data value "C" in FIG. 5, the data value "D" may be stored and only once, i.e., within an entry 602 of the first bank 108A, and, specifically, at the bucket index value 3 and at an entry 1 of the left bank 108A. Again as in FIG. 5, it is not necessary to update the auxiliary table 118, because the data value D at the entry 602 does not have a duplicate data value within the second bank 108B of the hash table 108. Consequently, the corresponding entry 604 of the auxiliary table which corresponds to the entry table of the 602 hash table may be left as having a duplicate flag DUP set to 0, and the entry index value OIDX also left at a value of 0.

Figure 7:
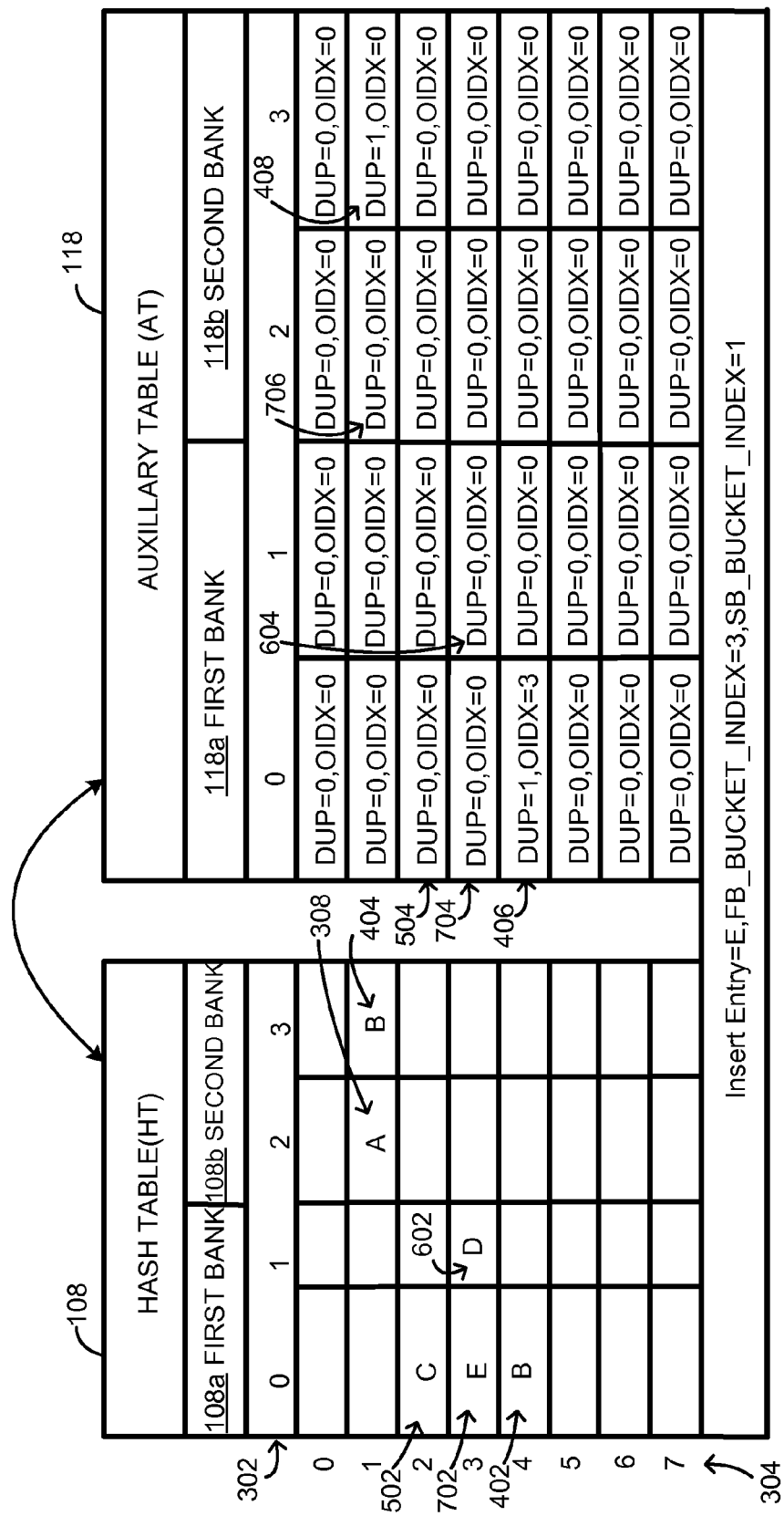
FIG. 7 illustrates a further example implantation of the hash table and associated auxiliary table of FIG. 6.

FIG. 7 illustrates a further example in which a fifth-received key is mapped to bucket index value 3 of the first bank 108A by the first hash function 110A, and simultaneously mapped to bucket index value 1 of the second bank 108B of the hash table 108. In this case, as shown, both entries 0 and 1 of the bucket index value 3 are full from previous operations, as shown in FIG. 6. As also shown in FIG. 6, the bucket index value 1 is full from previous insert operations as well (i.e., both entries 2 and 3 are filled with data values "A" and "B" respectively).

Therefore, as described above with respect to FIG. 1, the table operations manager 116 may nonetheless be configured to insert a data value "E" associated with the fifth-received key, by taking advantage of the presence of duplicate values within a hash table 108. Specifically, as just described with respect to FIG. 6, and as originally shown with respect to FIG. 3, the entries 306 and 308 contain duplicate data values of the data value "A", as reflected in entries 310 and 312 of the auxiliary table 118 Therefore, if the fifth-received key is hashed by the hash functions 110A and 110B to a corresponding bucket index value 3 or 1 of the hash table 108, it may be determined that a data value "E" corresponding to the fifth-received key initially does not have space to be stored within any of the entries 304 associated with either the bucket index value 3 or 1. That is, as shown in FIG. 6, entries 0 and 1 of the first bank 108A are filled at bucket index value 3 with data values "A" and "D" (entries 306 and 602), while entries 2 and 3 of the second bank 108B at a bucket index value 1 are filled with the data values "A" and "B" (entries 308 and 404).

Therefore, in order for the table operations manager 116 to continue with an attempt to insert the data value "E", the table operations manager 116 may first examine whether any of the data values within the filled entries of the hash table 108 are associated with a duplicate data value. In this example, the table operations manager 116 may, for example, examine the data value "A" at the entry 306, and, more specifically, may examine the entry 306 with a corresponding entry 310 within the auxiliary table 118 to determine from the duplicate flag DUP that a duplicate data value does in fact exist.

Then, as described above, the table operations manager 116 may invoke the hash calculator 110, and specifically, may invoke the second hash function 110B, to recalculate the bucket index value 1 associated with the data value "A" and its corresponding first-received key. Then, from the entry 310 of the auxiliary table 118, and more specifically, from the OIDX value stored therein of 2, the table operations manager 116 may determine that the duplicate data value of the data value "A" is stored at entry 308, and specifically, at entry 2 of the bucket index value 1 within the second bank 108B.

Knowing that such a duplicate value exists, the table operations manager 116 may thus delete the data value "A" from the entry 306, to be replaced by the data value "E" shown as entry 702 in FIG. 7. In this way, the data value "E" may be easily inserted into the hash table 108, without having to move or otherwise reorder either the data value "A" at entry 306 or the duplicate data value "A" at entry 308.

In order to complete this operation, the table operations manager 116 may then instruct the auxiliary table manager 120 to update, to thereby reflect the insertion of the data value "E". Specifically, the auxiliary table manager 120 may update the entry 310 of FIG. 6, so that, as shown in entry 704 of FIG. 7, the duplicate flag DUP is now set to 0, so that the corresponding entry index OIDX must also be set to 0. Similarly, the entry 312 of FIG. 6 may be updated to the entry 706 of FIG. 7, also reflecting values of 0. Thereby, it is indicated that neither corresponding entry 702 and 308 of hash table 108 of FIG. 7 is associated with any duplicate values thereof.

Figure 8:
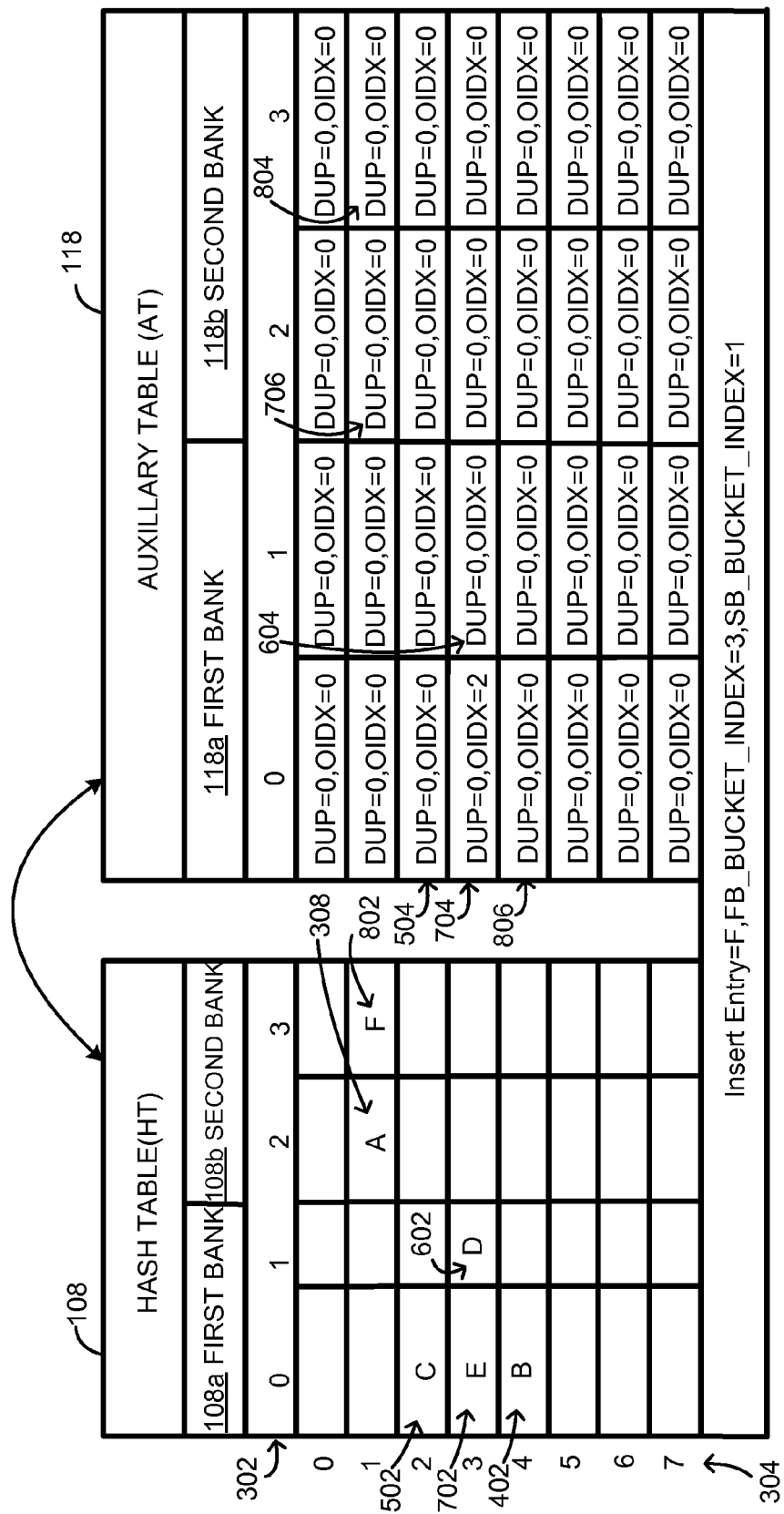
FIG. 8 illustrates a further example implantation of the hash table and associated auxiliary table of FIG. 7.

FIG. 8 provides a similar example as FIG. 7, but with respect to the data value "B". Similarly, as illustrated above with respect to FIGS. 4-6, the data value "B" may be inserted at entry 402, with a corresponding duplicate data value "B" at the entry 404. As described above, corresponding entries 406, 408 may be inserted into the auxiliary table 118, so as to provide information about the presence and location of the duplicate data values or the data value "B". Thus, in FIG. 8, it may occur that a sixth-received key may be hashed by the first hash function 110A to the bucket index value 3 of the bucket index values 304, and by the second hash function 110B to the bucket index value 1 of the bucket index vales 304.

As shown above with respect to FIGS. 6 and 7, however, both bucket index values 3 and 1 already are filled with data values. Consequently, the table operations manager 116 may check to determine whether any of these stored values filling the relevant buckets is associated with a duplicate data value within the hash table 108. In the case of FIG. 8, as may be observed from FIGS. 6 and 7, the data value "B" is in fact duplicated within the hash table 108. That is, as just described, entries 402 and 404 both include duplicates of the data value "B", and entries 406 and 408 to the auxiliary table 118 provide duplicate references about the presence and location of such duplicate values.

Consequently, the table operations manager 116 may determine both the existence of the data value "B" within the entry 404 as a duplicate of the data value "B" within the entry 402, and may therefore determine an acceptability of deleting the duplicate data value "B" within the entry 404, and inserting a data value "F" corresponding to the sixth-received key as hashed by the second hash function 110B, as shown at an entry 802 of the hash table 108 in FIG. 8. As described above with respect to FIG. 7, subsequent operations of the auxiliary table manager 118 may be implemented to update corresponding entries of the auxiliary table 118. That is, the entries 406 and 408 may be updated so that the duplicate flag DUP is set to 0 as shown in the entries 804 and 806 of FIG. 8. At the same time, since no duplicate data values now exist, the entry index value or OIDX may also be set to 0, as also shown in the entries 804 and 806 of the auxiliary table 118 of FIG. 8.

Finally with respect to FIG. 8, a seventh-received key may be hashed by the first hash function 110A to the bucket index value 3 while the seventh-received key is also hashed by the second hash function 110B to the bucket index value 1 (i.e., the same result as described above with respect to the sixth-received key in the context of FIG. 8 and data value "F"). Then, as in the example of FIG. 8, the table operations manager 116 may detect that all entries of the hashed bucket index values are full (i.e., entries 702, 602, 308, and 802, and, moreover, that none of the just referenced entries are associated with any duplicate data values within the hash tables 108 (as may be determined by consultation of corresponding entries 704, 604, 706, and 804)). In this case, the table operations manager 116 may determine that a hash miss or a hash collision has occurred, and may send a negative acknowledgement reflecting the failure of the insertion of the data value to be stored in association with the seventh-received key.

However, it may be observed that such a negative acknowledgement has been delayed in its sending due to the presence of the various duplicate data values described with respect to FIGS. 3-8. Consequently, it may also be observed that a first miss utilization (FMU) of the apparatus 126 and of the hash table controller 102 may be improved relative to implementations which do not include use of duplicate values as described herein.

Figure 9:
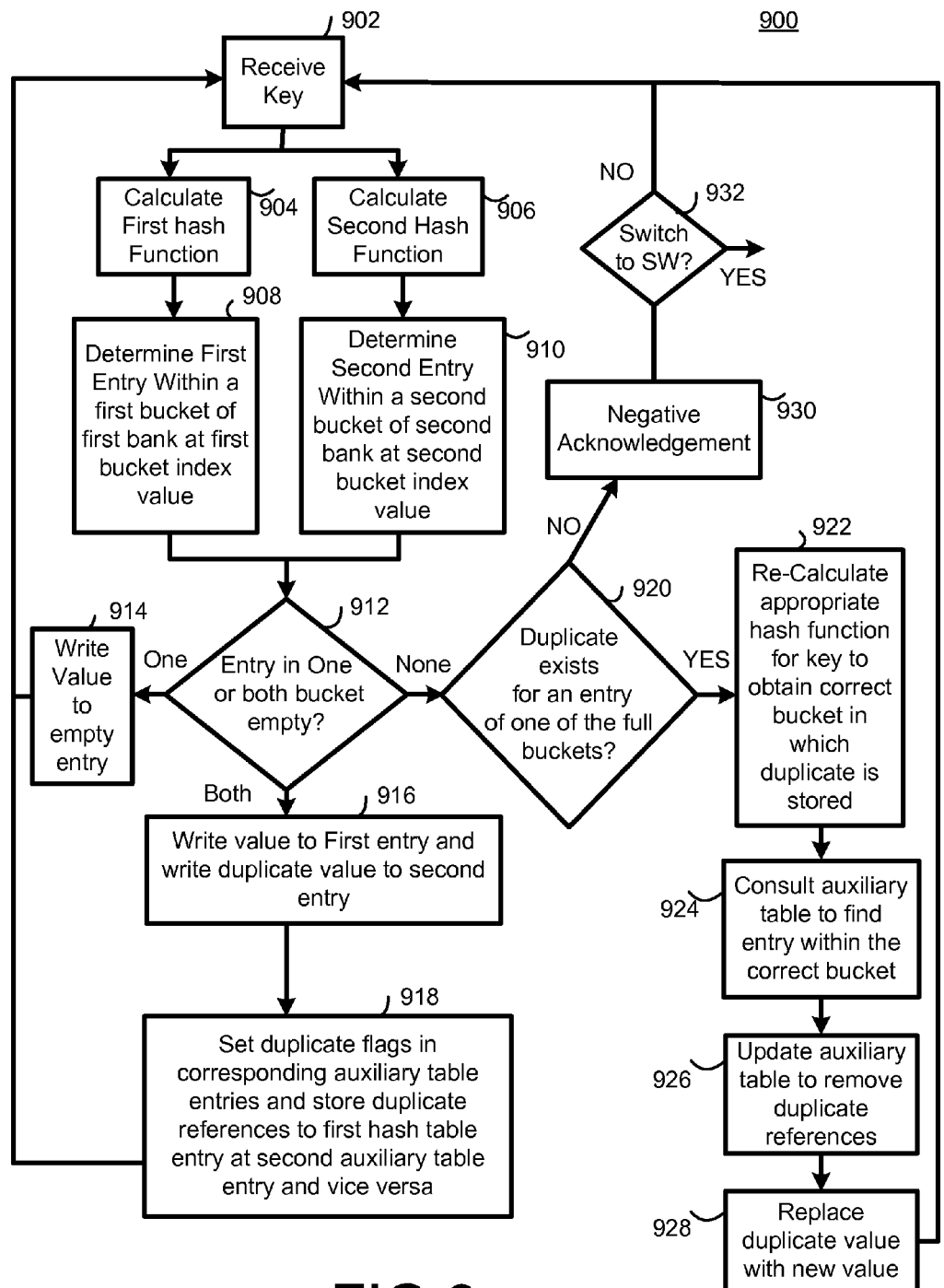
FIG. 9 is a flowchart illustrating additional example operations of the system of FIG. 1 with respect to the example hash table and auxiliary table of FIGS. 3-8.

FIG. 9 is a flowchart 900 illustrating example operations of the system 100 of FIG. 1, with reference to the examples of FIGS. 3-8. In the example of FIG. 9, a key 104 may be received (902). In response, the hash calculator 110 may execute the first hash function 110A (904) while simultaneously calculating the second hash function 110B (906).

From the calculation of the first hash function 110A, a first entry within a first bucket of the first bank of the hash table 108 may be determined, so that a value associated with the key 104 may be stored at the corresponding first bucket index value (908). Meanwhile, similarly, a second entry within a second bucket of the second bank of the hash table 108 may be determined for storage of a duplicate data value of the value associated with the key 104 (910).

Then, the table operations manager 116 may examine the thus-calculated entries to determine whether one or more entries in one or both of the hashed bucket index values may be empty (912). If only one of the entries is empty, then the table operations manager 116 may insert the data value into the empty entry (914). Such an example corresponds to the example of FIG. 5, in which the data value "C" was inserted at entry 502, as described in detail above.

On the other hand, if both entries are empty (912), then the table operations manager 116 may insert the value into the first entry and insert a duplicate data value into the second entry (916). Such an example corresponds to the examples of FIGS. 3 and 4 above, in which the duplicate data values "A" and "B" are inserted at both of first and second entries 306/308 and 402/404, respectively.

Duplicate flags may be set in corresponding auxiliary table entries (918), in order to indicate the presence and location of the thus stored duplicate data values. For example, again with reference to examples of FIGS. 3 and 4, the table operations manager 116 may instruct the auxiliary table manager 120 to set a duplicate flag to positive and to record at least an identification of an entry index of each duplicate data value, as described above with respect to entries 310/312 and 406/408 of FIGS. 3 and 4, respectively. Having completed these operations, the hash table controller 102 may proceed to wait for and/or process a next received key (902).

If none of the hashed buckets are in fact empty (912), that is, all entries of both hashed bucket index values are determined to be full, then the table operations manager 116 may determine whether a duplicate exists for at least one entry of all the filled entries of the hashed bucket index values (920). As described above, the table operations manager 116 may determine an existence of such duplicate values simply by checking entries of the auxiliary table 118 which correspond to the filled entries of the hash bucket index values.

Specifically, the table operations manager 116 may invoke the hash calculator 110 to recalculate the appropriate/corresponding hash function for the key in question to obtain the correct bucket in which the duplicate data value is stored (922). That is, as explained with respect to the example FIG. 7, upon determination of duplicate data values stored in association with the entry 306, the table operations manager 116 may thus determine that the bucket index value of the corresponding duplicate data value is 1, as described above with respect to FIGS. 3 and 7, whereupon the table operations manager 116 may consult the auxiliary table to find an identity of the entry within the thus-identified bucket which contains the duplicate data value (924). That is, the table operations manager 116 may consult the entry 310 of the auxiliary table 118 to determine that the duplicate data value within the bucket index 1 is located within entry 2, as indicated by the OIDX entry stored in the entry 310.

Subsequently, the auxiliary table 118 may be updated to remove the duplicate references (926). For example, the auxiliary table manager 120 may be instructed to set the duplicate flag values of the entry 704, 706 to 0 as shown in FIG. 7, so that the corresponding entry index value OIDX are also set to 0.

In association with these operations, the duplicate data value may be replaced with the value to be entered (i.e., the data value "E" in the example of FIG. 7, or the data value "F" in the example of FIG. 8). At this point, again, the hash table controller 102 may process, or continue to wait for, a next received key (902).

If it is determined that no duplicate exists for any entry of the relevant bucket index values (920), then, as described above with respect to FIG. 8, a negative acknowledgement may be sent (930), indicating that a hash miss or hash collision has occurred and that the value associated with the received key may not be stored in the indicative bucket of the hash table 108 at this time. In this case, as referenced above, it is possible to switch to software control of the hash table 108. For example, the software reordering technique known as cuckoo hashing and referenced above may be implemented. Such software reordering techniques generally involve movement or relocation of a data value from the desired but full entries into another entry of the hash table 108, which may cause a chain reaction movement of a current data value from such an entry to yet another entry of the hash table 108. Such a reordering chain reaction may continue, e.g., until either an infinite loop is encountered or until an empty entry is encountered. As referenced above, such software reordering techniques are known in the art and are not described in detail herein.

If it is decided not to convert to software control of the hash table 108 (932), or if such an option is not available, then, again, the hash table controller 102 may continue to process or wait for a next received key (902).

In example implementations, additional area in the apparatus 126 of FIG. 1 (e.g., in microchip surface area used to implement the memories 130) may be used to implement the auxiliary table 118. Specifically, in some implementations, spare bits of the memory 130 used to implement the hash table 108 may be used to implement the auxiliary table 118 or portions thereof. Consequently, an increase in area required to implement such example implementations, as compared to conventional techniques, may be minimized.

As would be appreciated by one of skill in the art, implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A hash table controller comprising:
 a hash calculator configured to receive a key and to determine, based thereon, a first entry in a first bank of a hash table for a value associated with the key and determine a second entry in a second bank of the hash table for the value;
 a table operations manager configured to determine that the first entry and the second entry are empty, and to store the value and a duplicate of the value at both the first entry and the second entry, respectively; and
 an auxiliary table manager configured to store, in an auxiliary table and in conjunction with the value, a first duplicate reference to the duplicate of the value and a reference to the second entry.

2. The hash table controller of claim 1, wherein the table operations manager is configured to insert a second value associated with a second key including deleting the duplicate value and replacing the duplicate value with the second value.

3. The hash table controller of claim 2 comprising:
 an auxiliary table manager configured to manage an auxiliary table that is used to detect, for the value, a presence and location of the duplicate value within the hash table.

4. The hash table controller of claim 1, wherein the hash table includes a plurality of bucket index values, each bucket index value having at least two entries within each of the first and second banks, wherein the first entry is included in a first bucket at a first bucket index value and the second entry is included in a second bucket at a second bucket index value.

5. The hash table controller of claim 4, wherein the hash calculator is configured to determine the first entry including calculating a first hash function for the key to obtain the first bucket index value of the first entry, and to determine the second entry including calculating a second hash function for the key to obtain the second bucket index value of the second entry.

6. The hash table controller of claim 1, wherein the auxiliary table manager is configured to store, in the auxiliary table and in conjunction with the duplicate of the value, a second duplicate reference to the value and a reference to the first entry.

7. The hash table of claim 6, wherein the auxiliary table manager is configured, in response to a deletion of the duplicate value, to update the auxiliary table by removing the first duplicate reference and the second duplicate reference.

8. The hash table of claim 6, wherein the auxiliary table is an equivalent size of the hash table and has a number and structure of entries that correspond to entries of the hash table, including a first bank of the auxiliary table and a second bank of the auxiliary table.

9. The hash table of claim 6, wherein the hash calculator is configured to receive a second key and to determine, based thereon, the first bucket index value in the first bank of the hash table for a second value and at least another bucket index value in the second bank of the hash table for the second value, and wherein the table operations controller is configured to execute an insert operation including:
 determining that all entries of the first bucket index value including the first entry and the at least another bucket index value including the at least another entry are full, and
 deleting the value at the first entry and storing the second value therein.

10. The hash table controller of claim 9, wherein the auxiliary table manager is configured to facilitate the insert operation of the second value and update the auxiliary table accordingly, including:
 determining from the first entry a corresponding entry of the auxiliary table in which the first duplicate reference is stored;
 determining from the first duplicate reference that the duplicate value exists; and
 modifying the first duplicate reference and the second duplicate reference within the auxiliary table to reflect the deletion of the value from the first entry.

11. The hash table controller of claim 10, wherein the auxiliary table manager is further configured to modify the auxiliary table to reflect the deletion of the value from the first entry by locating the second duplicate reference within the auxiliary table,
 including determining from the key and the second hash function the second bucket index value at which the duplicate value is stored within the hash table; and determining from the first duplicate reference the second entry of the second bucket index value in which the duplicate value is stored.

12. A method comprising:
 determining a first entry in a first bank of a hash table for a value;
 determining a second entry in a second bank of the hash table for the value;
 determining that the first entry and the second entry are empty;
 storing the value and a duplicate of the value at the first entry and the second entry, respectively;
 storing a first duplicate reference to the duplicate value in an auxiliary table in conjunction with the first entry, wherein the first duplicate reference includes an identification of the second entry at which the duplicate value is stored.

13. The method of claim 12, comprising:
 inserting a second value associated with a second key at the second entry, including deleting the duplicate value and replacing the duplicate value with the second value.

14. The method of claim 13, wherein the inserting the second value comprises:
 determining, using an auxiliary table and based on the value, a presence and location of the duplicate value within the hash table.

15. The method of claim 12, comprising:
 storing a second duplicate reference to the value in the auxiliary table in conjunction with the second entry.

16. The method of claim 15, wherein each bank has a plurality of bucket index values, each bucket index value having at least two entries, and wherein the second duplicate reference includes an identification of the first entry at which the value is stored.

17. The method of claim 12, wherein determining the first entry includes calculating a first hash function for a key to obtain a first bucket index value and thereby the first entry, and wherein determining the second entry includes calculating a second hash function for the key to obtain a second bucket index value and thereby the second entry.

18. An apparatus comprising:
at least one memory, the at least one memory storing a hash table including at least two banks associated with a plurality of bucket index values, each bucket index value associated with at least two entries within each of the at least two banks, and an auxiliary table; and
at least one memory controller configured to store, within a first bank of the at least two banks, a value within a first entry of a first bucket index value obtained from application of a first hash function to a key, and to store, within a second bank of the at least two banks, a duplicate value of the value within a second entry of a second bucket index value obtained from application of a second hash function to the key,
wherein the at least one memory controller is configured to store, within the auxiliary table and in conjunction with the value, a first duplicate reference to the duplicate value and a reference to the second entry.

19. The apparatus of claim 18, wherein the at least one memory controller is configured to insert a second value associated with a second key including deleting the duplicate value;
replacing the duplicate value with the second value; and
updating the auxiliary table to remove the duplicate reference.

20. The apparatus of claim 18, wherein the at least one memory controller is configured to identify the first bucket index value for the first bank from application of the first hash function to a second key associated with a second value, and to determine at least another bucket index value for the second bank from application of the second hash function to the second key, and further configured to determine that all entries of the first bucket index value and of the second bucket index value are full, and to replace the first value within the first entry with the second value, based on determining the presence of the duplicate value from the auxiliary table.

* * * * *